(12) United States Patent
Eriksson Lowenmark et al.

(10) Patent No.: US 8,311,076 B2
(45) Date of Patent: Nov. 13, 2012

(54) TIMESLOT HOPPING FOR TRANSMITTING CALL DATA

(75) Inventors: Stefan Eriksson Lowenmark, Hasselby (SE); Miguel Lopez, Solna (SE); Marten Sundberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 159 days.

(21) Appl. No.: 12/933,934

(22) PCT Filed: Feb. 3, 2009

(86) PCT No.: PCT/SE2009/050108
§ 371 (c)(1), (2), (4) Date: Dec. 15, 2010

(87) PCT Pub. No.: WO2009/123540
PCT Pub. Date: Oct. 8, 2009

(65) Prior Publication Data
US 2011/0122922 A1    May 26, 2011

Related U.S. Application Data

(60) Provisional application No. 61/040,847, filed on Mar. 31, 2008.

(51) Int. Cl.
*H04B 1/00* (2006.01)
(52) U.S. Cl. ........ 375/138; 375/132; 370/321; 370/336; 370/337; 370/347

(58) Field of Classification Search .................. 370/321, 370/336–337, 347, 203–211; 375/132, 138; 398/99
See application file for complete search history.

(56) References Cited

U.S. PATENT DOCUMENTS

| | | | |
|---|---|---|---|
| 6,608,821 B1 | 8/2003 | Gendel | |
| 2008/0165746 A1* | 7/2008 | Sung et al. | 370/337 |
| 2009/0245396 A1* | 10/2009 | Sung et al. | 375/260 |

FOREIGN PATENT DOCUMENTS

| | | |
|---|---|---|
| WO | WO 93/22850 A1 | 11/1993 |
| WO | WO 98/53559 A2 | 11/1998 |
| WO | WO 98/53559 A3 | 11/1998 |

OTHER PUBLICATIONS

International Preliminary Report on Patentability, PCT Application No. PCT/SE2009/050108, Sep. 24, 2010.
International Search Report, PCT/SE2009/050108, Sep. 24, 2009.
Written Opinion of the International Preliminary Examining Authority, PCT Application No. PCT/SE2009/050108, Sep. 24, 2009.
Written Opinion of the International Preliminary Examining Authority, PCT Application No. PCT/SE2009/050108, May 17, 2010.

* cited by examiner

*Primary Examiner* — Curtis Odom
(74) *Attorney, Agent, or Firm* — Myers Bigel Sibley & Sajovec, P.A.

(57) ABSTRACT

The invention relates to a method for transmitting call data in a digital wireless communication network, said call data being transmitted over at least one radio frequency channel in a sequence of timeslots. Call data are transmitted in the network using timeslot hopping in which the call data of each user of the network are transmitted with a different timeslot hopping sequence.

14 Claims, 7 Drawing Sheets

FIG. 2

| TIMESLOT NUMBER | Frame 1 | Frame 2 | Frame 3 | Frame 4 | Frame 5 | Frame 6 |
|---|---|---|---|---|---|---|
| 8 | | | | | | |
| 7 | | | | | | |
| 6 | | | | | | |
| 5 | | | | | | |
| 4 | | | M5 | M5 | | M4 |
| 3 | M3 | M1 | M2 | M1 | M3 | M2 |
| 2 | M2 / M5 | M3 / M4 | M4 / M3 | M3 / M4 | M2 / M5 | M3 / M1 |
| 1 | M1 / M4 | M2 | M5 | M2 | M1 / M4 | M5 |

TDMA FRAME NUMBER

| | M1 | M2 | M3 | M4 | M5 |
|---|---|---|---|---|---|
| TIMESLOTS ALLOCATED FOR HOPPING | {1,2,3} | {1,2,3} | {1,2,3} | {1,2,3} | {1,2,3} |
| TIMESLOT PATTERN | [0,2,1,2,0,1] | [1,0,2,0,1,2] | [2,1,0,1,2,0] | [0,1,2,1,0,2] | [1,2,0,2,1,0] |
| SUBCHANNEL | 0 | 0 | 0 | 1 | 1 |
| TIMESLOT HOPPING SEQUENCE | [1,3,2,3,1,2,...] | [2,1,3,1,2,3,...] | [3,2,1,2,3,1,...] | [1,2,3,2,1,3,...] | [2,3,1,3,2,1,...] |

| Timeslot Number | | | | | | | |
|---|---|---|---|---|---|---|---|
| 8 | | | | | | | |
| 7 | | | | | | | |
| 6 | | | | | | | |
| 5 | | | | | | | |
| 4 | | | | | | | |
| 3 | M2 | M4 | M3 | M2 | M2 | M2 | M3 |
| 2 | M1 | M2 | M4 | M1 | M1 | M1 | M4 |
| 1 | | M1 | M3 | M4 | M3 | M3 | ... |
| | 1 | 2 | 3 | 4 | 5 | 6 | |

TDMA FRAME NUMBER

| | M1 | M2 | M3 | M4 |
|---|---|---|---|---|
| TIMESLOTS ALLOCATED FOR HOPPING | {1,3} | {1,3} | {1,3} | {1,3} |
| TIMESLOT PATTERN | [0,0,0,0,0,0] (Legacy MS) | [1,1,1,1,1,1] (Legacy MS) | [0,1,0,1,0,1] | [1,0,1,0,1,0] |
| SUBCHANNEL | 0 | 0 | 1 | 1 |
| TIMESLOT HOPPING SEQUENCE | [1,1,1,1,1,1,...] | [3,3,3,3,3,3,...] | [1,3,1,3,1,3,...] | [3,1,3,1,3,1,...] |

| | M1 | M2 | M3 |
|---|---|---|---|
| MA | {1,4,7} | {1,4,7} | {1,4,7} |
| BASIC HOPPING SEQUENCE | [0,2,1,2,0,1] | [0,2,1,2,0,1] | [0,2,1,2,0,1] |
| MAIO | 0 | 1 | 2 |
| FREQUENCY HOPPING SEQUENCE | [1,7,4,7,1,4,...] | [4,1,7,1,4,7,...] | [7,4,1,4,7,1,...] |

FIG. 5

| | M1 | M2 | M3 | M4 | M5 |
|---|---|---|---|---|---|
| MA | {1,4,7} | {1,4,7} | {1,4,7} | {1,4,7} | {1,4,7} |
| BASIC HOPPING SEQUENCE | [0,2,1,2,0,1] | [0,2,1,2,0,1] | [0,2,1,2,0,1] | [0,2,1,2,0,1] | [0,2,1,2,0,1] |
| MAIO | 0 | 1 | 2 | 0 | 1 |
| SUB-CHANNEL | 0 | 0 | 0 | 1 | 1 |
| FREQUENCY HOPPING SEQUENCE | [1,7,4,7,1,4,...] | [4,1,7,1,4,7,...] | [7,4,1,4,7,1,...] | [1,7,4,7,1,4,...] | [4,1,7,1,4,7,...] |

TIMESLOT HOPPING FOR TRANSMITTING CALL DATA

CROSS REFERENCE TO RELATED APPLICATION

This application is a 35 U.S.C, §371 national stage application of PCT International Application No. PCT/SE2009/050108, filed on 3 Feb. 2009, which itself claims priority to U.S. provisional patent Application No. 61/040,847, filed 31 Mar. 2008, the disclosure and content of which are incorporated by reference herein in their entirety. The above-referenced PCT International Application was published in the English language as International Publication No. WO 2009/123540 A2 on 8 Oct. 2009.

TECHNICAL FIELD

This invention relates to a method for transmitting call data in a digital wireless communication network and to a network node of the digital wireless communication network transmitting call data of at least two users.

BACKGROUND

The rapid growth of the subscriber base in GSM has stressed the need for increased voice capacity. Thus, both mobile network operators and telecom equipment manufacturers have agreed to open a new study item in 3GPP standardization. The study item has been named MUROS (Multiple User Reusing One Slot) and is described in GP-072027, "WID on MUROS". The basic idea is to allow two (or more) users to share the same carrier frequency and the same timeslot, both in the downlink and in the uplink. There are several possible technical realizations of MUROS.

In one MUROS solution (GP-070214, "Voice Capacity Evolution with Orthogonal Sub Channel", source Nokia), a QPSK modulation is used in the DL (downlink). The two user signals are mapped to the real and imaginary parts of the baseband signal. These are called the I and Q sub-channels, and under some conditions they are orthogonal, and therefore named OSC (Orthogonal Sub-Channels). In PCT/SE2008/050116 it is proposed to use a hybrid quaternary modulation in the DL.

In the uplink, i.e. in case data are transmitted from a mobile station to a base station, one solution (GP-070214, "Voice Capacity Evolution with Orthogonal Sub Channel", source Nokia) is to use GMSK modulation in the uplink. The two GMSK modulated signals from two mobile stations are transmitted on the same timeslot and carrier frequency (or sequence of frequencies in case frequency hopping is deployed). On the receiver side, multi-user detection or interference cancellation techniques can be used to demodulate the two signals.

Even though legacy mobiles are supported by the technique described in the above referred PCT application, new MS (Mobile Station) types will still be required because a new training sequence set is introduced.

Two (or more) users share one radio resource. Even though the name of the concept implies that orthogonality is involved, the two users are in fact not perfectly orthogonal since time dispersion on the channel (due to multipath propagation on the radio channel and filters in the transmitter and receiver) will cause leakage between the I and Q sub-channels. For the downlink, this means the two users will interfere one another. For the uplink, i.e. when data are transmitted from the mobile station to the base station, the phase difference between the two users will be random and hence orthogonality is not achieved even in the absence of time dispersion.

In the existing solutions, this lack of orthogonality results in that each user is interfered by the user using the other sub-channel. This interference will degrade the performance of each user. If discontinuous transmission (DTX) is used, the inter-sub-channel interferer will sometimes be present and sometimes not. The performance (e.g., speech quality) will be limited by the time periods when the interferer is present.

Further, in a scenario in which OSC is used for only a subset of the channels in a cell (e.g., due to the current cell load, there is no need to multiplex two users on all channels), users on OSC channels will experience worse link quality (e.g., coverage) than users on non-shared channels. This makes it more difficult to manage the quality in the network.

In the existing OSC solution, the frequency hopping standardized for GSM (3GPP TS 45.002, "Multiplexing and multiple access on the radio path") can be applied to the QPSK modulated signal in downlink and each of the GMSK modulated signals in uplink. Consequently, the two sub-channels will use the same frequency hopping sequence and hence the same frequency and timeslot at any given instant in time.

In summary, the existing solutions have several drawbacks leading to a deteriorated speech quality.

SUMMARY

Accordingly, it is an object of the present invention to obviate at least some of the above-mentioned disadvantages and to provide an improved speech quality for different users while maintaining an increased voice capacity transmitted over the wireless communication network.

This object is achieved by the features of the independent claims. In the dependent claims, preferred embodiments of the invention are described.

According to a first aspect of the invention, a method for transmitting call data in a digital wireless communication network is provided, the communication network having at least one radio frequency channel. The call data are transmitted over said at least one channel in a sequence of a predetermined number of timeslots wherein at least two users of the network share the same radio frequency channel and the same timeslot. According to this aspect of the invention, the call data from said at least two users are transmitted in the network using timeslot hopping in which each of said at least two users has a different timeslot hopping sequence. When two pairs of users use the same frequency channel and the same timeslot, interference between the users may occur. However, as the users have different timeslot hopping sequences, it can be avoided that call data of the same two pairs of users are continuously transmitted in the same radio frequency channel and the same timeslot over time. Accordingly, an interference diversity is obtained improving the speech quality of the transmitted data. As the time sequence of speech and speech pauses is normally different for different pairs of users, it is preferable to have an interference diversity in order to avoid that always the same users are interfering with each other. By using timeslot hopping sequences which are different for each user, it can be avoided that one user is always interfered by the same other user. The pairing of users sharing the same frequency and timeslot is broken improving the speech quality for each of the users in the network.

Furthermore, the call data of each radio frequency channel may be transmitted in a sequence of frames each frame containing said predetermined number of timeslots. In the present invention, the timeslot hopping sequence now indicates, for each frame of a sequence of frames, in which timeslot within the frame the call data of a predetermined user are provided. By way of example, eight timeslots may build one frame, the timeslot hopping sequence indicating from frame to frame in which of the eight timeslots within the frame the call data of one user are provided. According to this aspect of the invention, the timeslot sequence of one user differs from the timeslot sequence of another user.

According to another embodiment of the invention, the hopping sequence is determined in such a way that at most a predetermined number of users share the same timeslot at any time instant. By limiting the number of users sharing the same timeslot, it can be avoided that too many users share the same timeslot at any time instant helping to equally distribute the data over time. By way of example, the hopping sequences may be designed in such a way that at most two users hop onto the same frequency and timeslot. However, it may also be possible that another number of users share the same timeslot at any time instant.

The call data of each user sharing the same timeslot and transmitted in one radio frequency channel can be transmitted in a subchannel, the subchannel being orthogonal to the other subchannels of the same timeslot. When orthogonal subchannels are used, the interference between the different channels can be minimized.

According to another embodiment of the invention, the different timeslot hopping sequences for the different users may be obtained by providing a first group of users within a predetermined radio frequency channel using a timeslot hopping sequence with a constant timeslot number. Additionally, a second group of users exists within said predetermined radio frequency channel having a timeslot hopping sequence with a varying timeslot number. When each user of the second group has a different timeslot hopping sequence, it can be avoided that two users of the different users have the same timeslot hopping sequence. In this embodiment, the timeslot number of the first group of users can be kept constant and only the second group of users jumps from timeslot to timeslot in the sequence of frames.

In addition to the above-discussed timeslot hopping sequence, a frequency hopping may be carried out when the data are transmitted via a plurality of radio frequency channels with different radio frequencies. In this embodiment, a frequency hopping from one radio frequency channel to another radio frequency channel may be carried out. When the radio frequency hopping is used in addition to the timeslot hopping, the diversity of the different users can be further increased and the probability that call data of the same pairs of users are transmitted in the same timeslot and the same frequency channel is further minimized. The hopping sequences of the radio channel hopping sequence of the different users are also designed in such a way that at most a predetermined number of users hop onto the same frequency and timeslot.

When the timeslot hopping sequence scheme is used together with the radio frequency channel hopping sequence scheme, the different users may have the same radio frequency channel hopping sequence. This means that two users may use exactly the same frequency hopping sequence and since the call data of these users are in different timeslots they do not interfere with each other. In another embodiment, however, it is also possible that each of said users has a different radio frequency channel hopping sequence in addition to the different timeslot hopping sequence.

The invention, furthermore, relates to a base station controller of a digital wireless communication network controlling a transmission of the call data of at least two users. The controller is configured in such a way that it controls the transmission of the call data of different users over at least one radio frequency channel in a sequence of a predetermined number of timeslots. The controller controls the transmission in such a way that at least two users of the network share the same radio frequency channel and the same timeslot. Additionally, the controller is configured to introduce a timeslot hopping in the transmission in which each of the at least two users has a different timeslot hopping sequence. Furthermore, the controller may be adapted to control the transmission of the call data over a plurality of radio frequency channels. In addition to the timeslot hopping a frequency hopping from one radio frequency channel to the other may be carried out. As discussed above, the controller can be configured in such a way that during transmission the call data of users have either the same radio frequency channel hopping sequence or that each of said at least two users has a different radio frequency hopping sequence.

The invention, furthermore, relates to a base station of the digital wireless communication network that is transmitting the call data of said at least two users. The base station comprises at least one transceiver configured to transmit call data over at least one radio frequency channel in a sequence of a predetermined number of timeslots. The transceiver transmits the call data as controlled by the base station controller, i.e., the call data of each user has a different timeslot hopping sequence.

BRIEF DESCRIPTION OF THE DRAWINGS

The invention as well as a preferred mode of use, further objectives and advantages thereof will best be understood by reference to the following detailed description of illustrative embodiments when read in conjunction with the accompanying drawings, wherein

FIG. 2 shows an example of a timeslot hopping of five users, each user having a different timeslot hopping sequence;

FIG. 3 shows another embodiment of a timeslot hopping with one group having a constant timeslot number and another group having a varying timeslot hopping sequence;

FIG. 4 shows an embodiment of a frequency hopping with different radio frequency channels;

FIG. 5 shows another embodiment of a radio frequency hopping;

DETAILED DESCRIPTION

Figure 1:
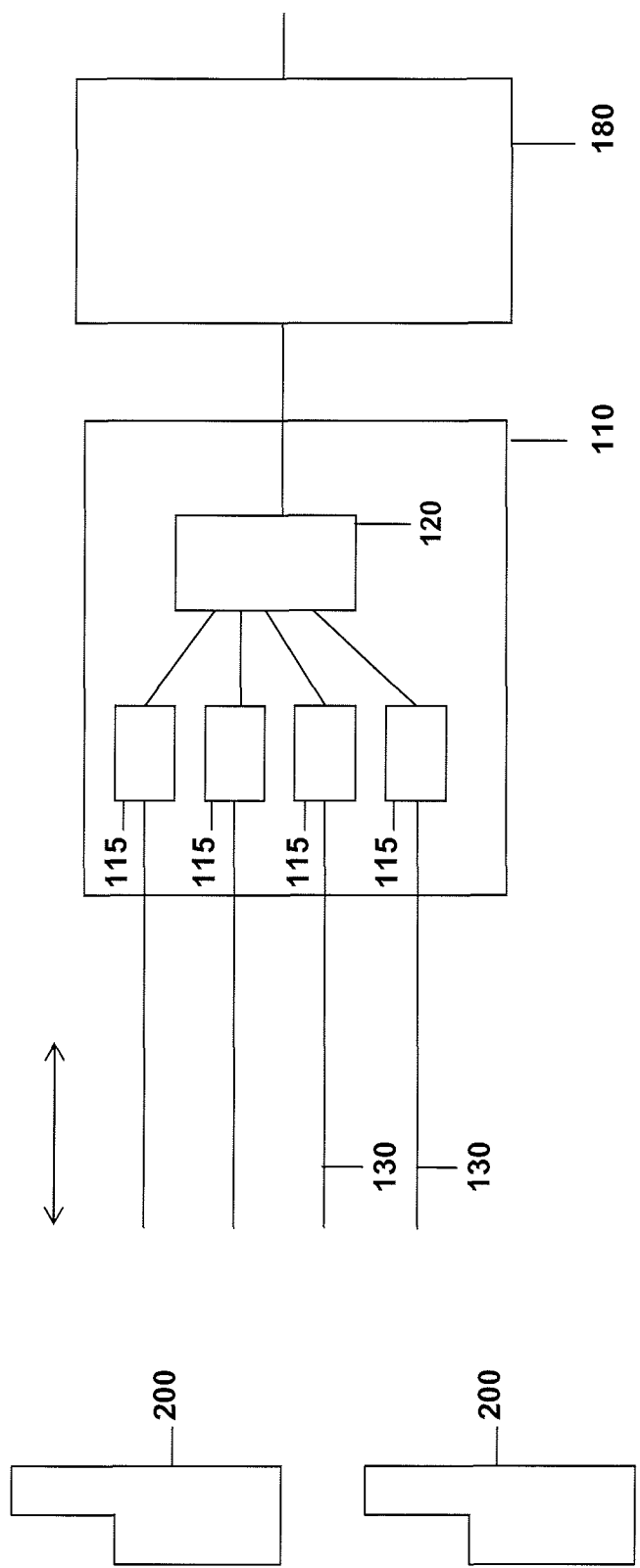
FIG. 1 shows a block diagram of a base station subsystem of a digital wireless communication network transmitting call data over several radio frequency channels with which timeslot hopping and radio frequency hopping can be carried out.

In FIG. 1, a base station subsystem (BSS) of a digital wireless communication network is shown. The BSS comprises a base station or base transceiver station 110 transmitting call data from several mobile stations 200 to the core network or transmitting call data from the core network to the mobile stations 200 via antennas (not shown). The base station 110 divides the call data in several radio frequency channels 130 using a plurality of transceivers 115, the base station 110 comprising a controller 120 controlling the data transmission in the uplink and downlink. The controller 120 carries out instructions received from a base station controller 180, the base station controller being connected to e.g. a mobile switching center (not shown). The base station 110 is controlled by the base station controller 180 that determines a timeslot hopping sequence and a frequency hopping sequence for the call data if a frequency hopping is carried out in addition to the timeslot hopping.

In FIG. 2, one example of timeslot hopping is shown in which each user has a different hopping sequence. In the upper part of FIG. 2, the provision of the data of different mobile users M1 to M5 are shown in the different timeslot numbers. In the lower part of FIG. 2, the corresponding table is shown explaining the timeslot sequence of the different users M1 to M5. As shown in the upper table, the time is partitioned into TDMA frames, the TDMA frames being partitioned into timeslots. In the example shown, eight timeslots form a TDMA frame. In the first TDMA frame, the call data of mobile user M3 are provided in timeslot number 3, whereas the mobile users M2 and M5 share the second timeslot, the mobile users M1 and M4 sharing the first timeslot. In the lower table of FIG. 2, the timeslots used for hopping are shown in the second row, in the present embodiment, the timeslots 1, 2 and 3. In the third row of the table, a timeslot pattern is indicated, row 4, indicating the subchannel number. In the last row, the actual timeslot hopping sequence for the different users is shown. By way of example, the timeslot sequence [3,1,3,1] means the use of timeslot 3, then timeslot 1, then timeslot 3, then timeslot 1.

In the case of GSM, the timeslots allocated for hopping can be any sequence of [1,2,3,4,5,6,7,8], since there are in total eight timeslots. The timeslot pattern given in row 3 of the table shown in FIG. 2 may be used to determine the actual timeslot hopping sequence. In the following, it is assumed that k timeslots have been allocated for timeslot hopping. The timeslot pattern is a sequence of numbers between 0 and k−1. Given an allocation of timeslots, it defines the hopping sequence. In an example, if k=2 then the timeslot pattern [0,1,0,0] means use of the first timeslot in the set of allocated timeslots, then the second, then the first, then the first. Thus, if hopping over the timeslots [2,4], then the timeslot pattern [0,1,0,0] yield the timeslot hopping sequence [2,4,2,2]. Similarly, when using the timeslots [7,5] then the timeslot pattern [0,1,0,0] yields the timeslot sequence of [7,5,7,7]. In general, in case timeslots [x,y] are used, then the timeslot pattern [0,1,0,0] yields the timeslot sequence [x,y,x,x]. As can be deduced from the upper table and the last row of the lower table, the timeslot hopping sequence of each user is different. From FIG. 2 can be seen that, by way of example, in the first frame, the call data of user M3 do not interfere with call data of other users, whereas in the second frame, the call data of M3 interfere with the call data of M4. In the third frame, the call data of M3, however, interfere with the call data of M5 and so on. In the embodiment shown, the hopping sequences are defined so that at most two users share the same timeslot at any time instant. For all users, interference diversity is achieved as mobile station M1 is sometimes interfered by M4, sometimes by M5 and sometimes not interfered at all. A similar improvement can be seen for M2 to M5.

In the embodiment shown in FIG. 3, another timeslot hopping sequence is shown. As can be seen from the two tables, the timeslot number for the first two users, the legacy mobile users M1 and M2 stays the same. Mobile user M1 stays in timeslot 1 whereas mobile user M2 stays in timeslot 2 over the different frame numbers. The mobile users M3 and M4 now jump between the different timeslots 1 and 3. As in the embodiment of FIG. 2, the users M3 and M4 have different timeslot hopping sequences, M3 starting in timeslot 1, M1 starting in timeslot 3. This is obtained by the different timeslot patterns of users M3 and M4. Again, frequency diversity is achieved as mobile user M1 is sometimes interfered by mobile user M3 and sometimes by mobile user M4, and mobile user M2 is sometimes interfered by mobile user M4 and sometimes by mobile user M3.

Figure 6:
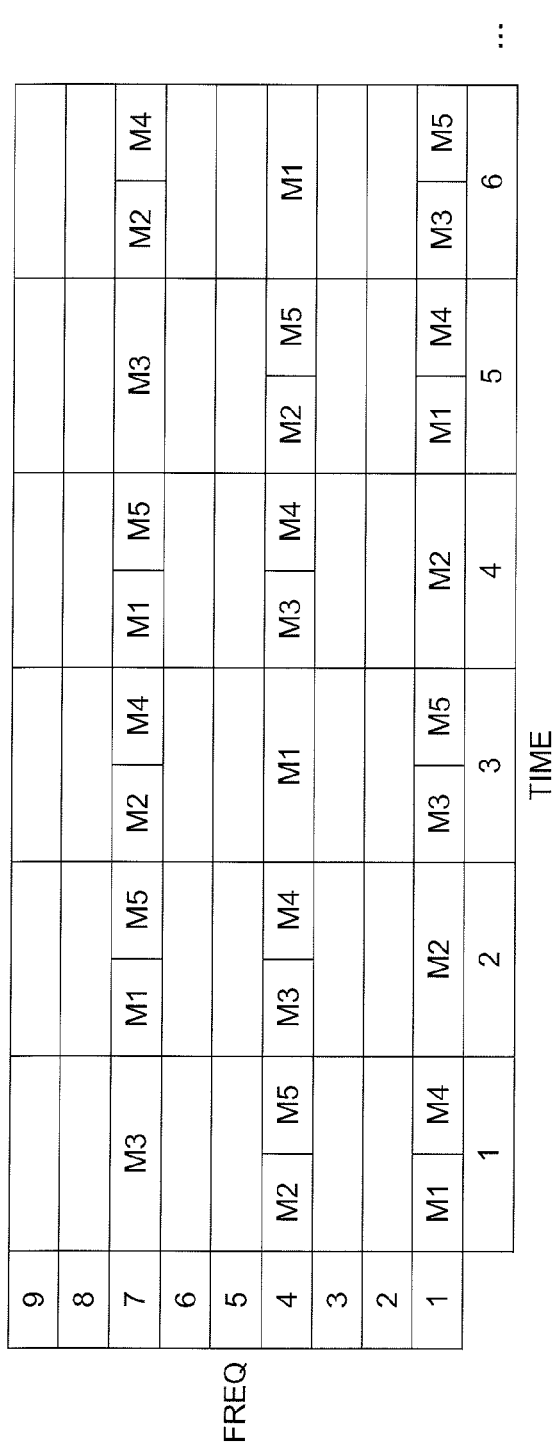
FIG. 6 shows another embodiment of a frequency hopping.

The timeslot hopping as shown in FIGS. 2 and 3 can now be combined with a frequency hopping scheme shown in FIGS. 4 to 6. Hopping in frequency can be achieved by using different frequency hopping schemes. The embodiments shown in FIGS. 2 and 3 can now be combined with a frequency hopping scheme where all mobile users have the same frequency hopping sequence. By way of example, in the embodiment shown in FIG. 3, M1 and M3 are the legacy mobiles using different timeslots. In case frequency hopping is additionally enabled, they may hop in frequency and they may use exactly the same frequency hopping sequences. Since they are in different timeslots, they do not interfere each other. Hence, the timeslot hopping mobile M3 and M4 in the second subchannel will also use the same frequency hopping sequences. In other words, this means that all four mobile users will use exactly the same frequency hopping sequence.

Another embodiment where different users use different frequency channels is shown in FIGS. 4 to 7.

In the embodiments shown in FIGS. 4 to 6, different frequency hopping sequences are used for different users. Numerous variants are possible. Preferably, the hopping sequences are designed so that utmost two users hop onto the same frequency and timeslot at any time instant.

In one embodiment of the invention, this is achieved as follows: The frequency hopping standardized for GSM (3GPP TS 45.002, "Multiplexing and multiple access on the radio path") is reused. The users in a cell are divided into two sets. The users in the first set are assigned one frequency hopping sequence (defined by a Hopping Sequence Number, HSN) and the users in the second set are assigned a second frequency hopping sequence. All users are assigned the same set of frequencies (e.g., defined by the Mobile Allocation, MA). Each user is given a Mobile Allocation Index Offset, MAIO) that is unique within its mobile set.

An example is given below.

The frequency group consists of 9 frequencies numbered 1, 2, . . . , 9.

⅓ reuse is used.

In the given cell, frequencies {1,4,7} are used (this is the MA).

First, consider the case where OSC is not used. Assume that, on a given timeslot, three mobile stations, M1, M2 and M3, are active in the cell. They are given the parameters shown in the lower table of FIG. 4. The length of the hopping sequences is assumed to be six. These hopping sequences are used for illustrative purposes only and do not reflect actual hopping sequences for GSM (3GPP TS 45.002, "Multiplexing and multiple access on the radio path").

The basic hopping sequence corresponds to the timeslot pattern discussed in connection with FIG. 2 in the frequency hopping sequence is calculated on the basis of the basic hopping sequence in the same way as the timeslot hopping sequence based on the timeslot pattern.

The frequency hopping is also illustrated in FIG. 4.

In the embodiment shown in FIG. 5, the mobile user M3 is never interfered, whereas the other mobile users M1, M2, M4 and M5 are always interfered by other users.

Next, consider the existing OSC solution. Assume that two more mobile stations are present in the cell, M4 and M5. They are assigned parameters as shown in the lower table of FIG. 5. As in the previous example the length of the hopping sequences is assumed to be six, and these hopping sequences are used for illustrative purposes only and do not reflect actual hopping sequences for GSM (3GPP TS 45.002, "Multiplexing and multiple access on the radio path").

It is evident that mobile stations M1 and M4 continuously use the two sub-channels of the same channel and thereby are subject to each other's inter-sub-channel interference. Similarly, M2 and M5 continuously interfere each other. M3, on the other hand, is not subject to any inter-sub-channel interference.

Finally, consider the OSC solution with improved frequency hopping. Assume there are still 5 mobile stations in the cell (on the considered timeslot number). These are assigned the following parameters as shown in the lower table of FIG. 6.

Also here the length of the hopping sequences is assumed to be six, and also here these hopping sequences are used for illustrative purposes only and do not reflect actual hopping sequences for GSM (3GPP TS 45.002, "Multiplexing and multiple access on the radio path").

The resulting frequency hopping is illustrated in the upper table of FIG. 6. It can be seen that the interference diversity has improved. E.g., mobile station M1 is sometimes interfered by M4, sometimes by M5 and sometimes not interfered at all. A similar improvement is seen for M2. M3, which was never subject to inter-sub-channel interference with the existing OSC solution, is now sometimes interfered by M4 or M5. But the fairness have improved due to the improved frequency hopping. Further, since the channel coding makes the channel robust to a certain amount of interference, it is likely that the speech quality on average has improved in the cell (assuming the network is well dimensioned to handle the given load). The different examples of the frequency hopping shown can be combined with the timeslot hopping.

Figure 7:
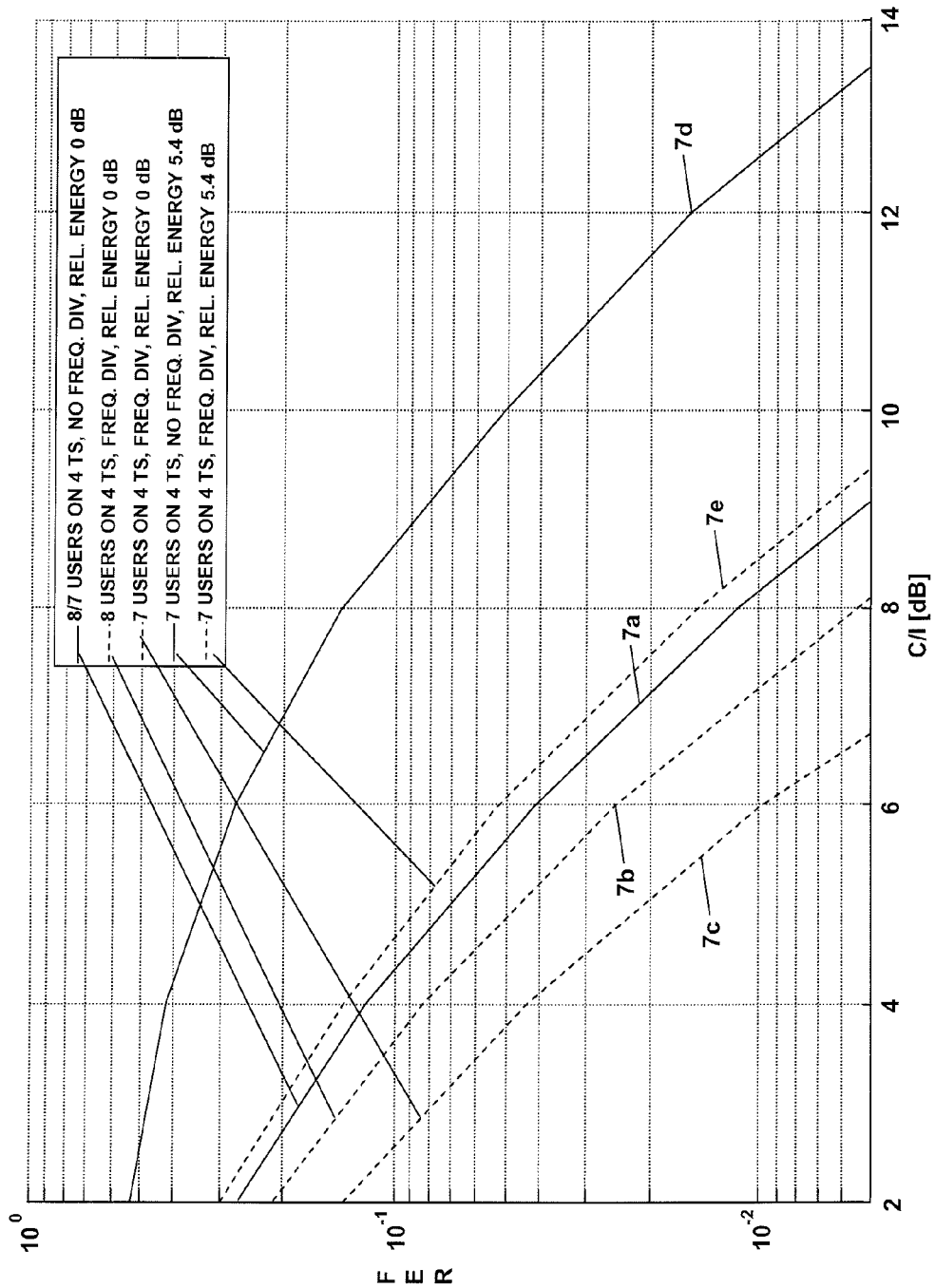
FIG. 7 shows simulation results of a cyclic frequency hopping over four frequencies.

In FIG. 7, simulations are shown that have been carried out using cyclic frequency hopping over four frequencies.

Scenarios where either 8 users or 7 users are sharing 4 timeslots have been investigated. For the case of 8 users on 4 time slots all timeslots use MUROS, while in case of 7 users only 3 out of four time slots utilize MUROS. The mobile stations are labeled M1 to M8.

Performance of one of the sub channels has been investigated. When frequency hopping scheme is applied the user investigated, M1, will cyclically be interfered by users M5, M6, M7 and M8 on the second sub channel (M2-M4 are allocated on the first sub-channel on the remaining frequencies). If no frequency hopping scheme is applied user M1 will always be allocated together with M4 on one timeslot.

DTX is modeled as a 2-state discrete time Markov chain where a speech activity factor and mean speech holding time can be set. Speech activity factor 0.6 and mean speech holding time 5 sec have been used in the simulations.

Simulations have been carried out on a TU3iFH channel using a DTS-2 interference scenario 3GPP TS 45.005, "Radio transmission and reception".

Now looking at FIG. 7, it can be seen that there is a clear gain of using the frequency hopping scheme when 8 users are multiplexed on 4 timeslots. A gain of approximately 1 dB can be seen @ 1% FER (curve 7a compared to curve 7b).

If only 7 users are allocated on the 4 timeslots the gain is increased to approximately 2 dB. User M1 is always multiplexed with M5 if no frequency diversity is used, while M1 will be allocated alone on every 4 burst if frequency diversity is used (curve 7a compared to curve 7c).

In DL the different MUROS branches can have different power levels due to power control. The power difference between the branches have been investigated at 5.4 dB (the branch with lowest power level is investigated). In this case the gain with the diversity scheme increases even further, to 4 dB (curve 7d compared to curve 7e).

The present invention has the advantage that interference diversity is increased. E.g., if a user is in DTX, the reduced inter-sub-channel interference is spread out among several other users instead of just one. Further, in a fractionally loaded cell (i.e., less than two users per timeslot), the link performance degradation due to sub-channel multiplexing is spread out among more users, thereby reducing the performance loss of each individual user.

The invention claimed is:

1. A method for transmitting call data in a digital wireless communication network with at least one radio frequency channel, the method comprising:
transmitting said call data over said at least one channel in a sequence of a predetermined number of timeslots, wherein at least two users of the network share the same radio frequency channel and the same timeslot, wherein said call data from said at least two users are transmitted in the network using timeslot hopping in which each of said at least two users has a different timeslot hopping sequence, and wherein the call data of each user sharing the same timeslot in one radio frequency channel are transmitted in a sub-channel that is substantially orthogonal to other sub-channel(s) of the same timeslot.

2. The method according to claim 1, wherein said call data of each radio frequency channel are transmitted in a sequence of frames, each frame containing said predetermined number of timeslots, wherein the timeslot hopping sequence indicates, for each frame of a sequence of frames, in which timeslot within the frame the call data of a predetermined user are provided.

3. The method according to claim 1, wherein the hopping sequence limits to no more than a predetermined number of users who share the same timeslot at any time instant.

4. The method according to claim 1, wherein a first group of users within a predetermined radio frequency channel transmits using a timeslot hopping sequence with a constant timeslot number, whereas a second group of users within said predetermined radio frequency channel transmits using a timeslot hopping sequence with a varying timeslot number, wherein each user of the second group has a different timeslot hopping sequence.

5. The method according to claim 1, wherein the call data are transmitted via a plurality of radio frequency channels with different radio frequencies using frequency hopping from one radio frequency channel to another radio frequency channel.

6. The method according to claim 5, wherein the call data are transmitted by said at, least two users using the same radio frequency channel hopping sequence.

7. The method according to claim 5, wherein each of said at least two users transmits some of said call data using a different radio frequency channel hopping sequence.

8. The method according to claim 5, wherein the hopping sequences of said at least two users limit to nor more than a predetermined number of users who hop onto the same frequency and timeslot.

9. A base station controller of a digital wireless communication network, the base station controller comprising:
circuitry that is configured to control transmission of call data of at least two users over at least one radio frequency channel in a sequence of a predetermined number of timeslots so that the at least two users of the network share the same radio frequency channel and the same timeslot, wherein the controller is further configured to control the transmission of the call data from said at least two users using timeslot hopping in which each of said at least two users has a different timeslot hopping sequence and so that the call data of each user sharing the same timeslot in one radio frequency channel are transmitted in a sub-channel that is substantially orthogonal to other sub-channel(s) of the same timeslot.

10. The base station controller according to claim 9, wherein the circuitry is further configured to control the transmission of the call data over a plurality of radio frequency channels using both the timeslot hopping and frequency hopping from one radio frequency channel to another channel.

11. The base station controller according to claim 10, wherein the circuitry is further configured to control the transmission so that said at least two users have the same radio frequency channel hopping sequence.

12. The base station controller according to claim 10, wherein the circuitry is further configured to control the transmission so that each of said at least two users has a different radio frequency channel hopping sequence.

13. A base station of a digital wireless communication network that is configured to transmit call data of at least two users, the base station comprising:

at least one transceiver configured to transmit the call data over at least one radio frequency channel in a sequence of a predetermined number of timeslots, to transmit the call data of different users so that at least two users of the network share the same radio frequency channel and the same timeslot, to transmit the call data from said at least two users using timeslot hopping in which each of said at least two users has a different timeslot hopping sequence and so that the call data of each user sharing the same timeslot in one radio frequency channel are transmitted in a sub-channel that is substantially orthogonal to other sub-channel(s) of the same timeslot.

14. The base station according to claim 13, further comprising a plurality of the transceivers configured to transmit the call data over a plurality of radio frequency channels, wherein the transceivers are configured to transmit the call data using both the timeslot hopping and frequency hopping from one radio frequency channel to another channel.

* * * * *